United States Patent
Lee et al.

(10) Patent No.: US 10,863,553 B2
(45) Date of Patent: Dec. 8, 2020

(54) V2X OPERATION METHOD PERFORMED BY TERMINAL IN WIRELESS COMMUNICATION SYSTEM AND TERMINAL USING SAME

(71) Applicant: LG ELECTRONICS INC., Seoul (KR)

(72) Inventors: Seungmin Lee, Seoul (KR); Hanbyul Seo, Seoul (KR)

(73) Assignee: LG Electronics Inc., Seoul (KR)

(*) Notice: Subject to any disclaimer, the term of this patent is extended or adjusted under 35 U.S.C. 154(b) by 210 days.

(21) Appl. No.: 16/071,606

(22) PCT Filed: Jan. 23, 2017

(86) PCT No.: PCT/KR2017/000786
§ 371 (c)(1),
(2) Date: Jul. 20, 2018

(87) PCT Pub. No.: WO2017/126950
PCT Pub. Date: Jul. 27, 2017

(65) Prior Publication Data
US 2019/0037597 A1    Jan. 31, 2019

Related U.S. Application Data

(60) Provisional application No. 62/281,737, filed on Jan. 22, 2016.

(51) Int. Cl.
*H04W 74/08* (2009.01)
*H04W 72/04* (2009.01)
(Continued)

(52) U.S. Cl.
CPC ......... *H04W 74/085* (2013.01); *H04W 72/04* (2013.01); *H04W 72/12* (2013.01);
(Continued)

(58) Field of Classification Search
CPC .......... H04W 74/085; H04W 74/0866; H04W 74/08; H04W 74/00; H04W 72/04; H04W 72/12; H04W 72/1247; H04W 4/40
See application file for complete search history.

(56) References Cited

U.S. PATENT DOCUMENTS

2011/0310868 A1   12/2011   Yang et al.
2014/0126448 A1    5/2014   Punz et al.
(Continued)

OTHER PUBLICATIONS

R1-156605: GPP TSG RAN WG1 Meeting #83bis, Anaheim, USA, Nov. 15-22, 2015, Catt, "Further Discussion on resource allocation mechanism in PC5-based V2V," pp. 1-7.
(Continued)

*Primary Examiner* — Kent Krueger
(74) *Attorney, Agent, or Firm* — Dentons US LLP

(57) ABSTRACT

The present invention provides a vehicle-to-X (V2X) operation method performed by a terminal in a wireless communication system, the method comprising the steps of: receiving, from a base station, information indicating at least one candidate resource occupied by a different terminal in relation to periodically-configured transmission resources, wherein the at least one candidate resource occupied by the different terminal is included in the transmission resources; and transmitting a V2X message generated by a terminal through the transmission resources on the basis of the information, wherein the terminal transmits the V2X message through a candidate resource which is not occupied by a different terminal among multiple candidate resources included in the transmission resources.

3 Claims, 14 Drawing Sheets

(51) Int. Cl.
*H04W 72/12* (2009.01)
*H04W 74/00* (2009.01)
*H04W 4/40* (2018.01)

(52) U.S. Cl.
CPC ....... *H04W 72/1247* (2013.01); *H04W 74/00* (2013.01); *H04W 74/08* (2013.01); *H04W 74/0866* (2013.01); *H04W 4/40* (2018.02)

(56) References Cited

U.S. PATENT DOCUMENTS

| | | |
|---|---|---|
| 2015/0110121 A1 | 4/2015 | Tan et al. |
| 2015/0126210 A1 | 5/2015 | Peng et al. |
| 2015/0271786 A1 | 9/2015 | Xue et al. |
| 2015/0334721 A1 | 11/2015 | Kim et al. |
| 2018/0227882 A1* | 8/2018 | Freda ............... H04W 4/46 |

OTHER PUBLICATIONS

Huawel, et al., "Collision Avoidance for Mode 2," R1-156932, 3GPP TSG RAN WG1 Meeting #83, Anaheim, USA, Nov. 7, 2015, see section 2.1.1-2.2.3; and figures 1-3.

Catt, "Further Discussion on Resource Allocation Mechanism in PC5-based V2V," R1-157449, 3GPP TSG RAN WG1 Meeting #83, Anaheim, USA, Nov. 13, 2015, see section 2.2.

NTT Docomo, "Discussion on Resource Allocation Enhancement for PC5 Based V2V Communications," R1-157313, 3GPP TSG RAN WG1 Meeting #83, Anaheim, USA, Nov. 7, 2015, see section 2.

XP051071877: "3rd Generation Partnership Project; Technical Specification Group Services and System Aspects; General Packet Radio Service enhancements for Evolved Universal Terrestrial Radio Access Network access", 3GPP Draft; 23401-D50, 3rd Generation Partnership Project, Mobile Competence Centre; F-06921 Sophia-Antipolis Cedex; France; Dec. 15, 2015, pp. 1-338.

* cited by examiner

V2X OPERATION METHOD PERFORMED BY TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2017/000786, filed on Jan. 23, 2017, which claims the benefit of U.S. Provisional Application No. 62/281,737 filed on Jan. 22, 2016, the contents of which are all hereby incorporated by reference herein in their entirety.

BACKGROUND OF THE INVENTION

Field of the Invention

The present invention relates to wireless communication and, more particularly, to a V2X operation method performed by a terminal in a wireless communication system and a terminal using the method.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, there has been a growing interest in D2D (Device-to-Device) technology for direct communication between devices. In particular, D2D is attracting attention as a communication technology for the public safety network. Commercial communication networks are rapidly changing to LTE, but current public safety networks are mainly based on 2G technology in terms of conflicts with existing communication standards and cost. These technological gaps and demands for improved services have led to efforts to improve public safety networks.

Public safety networks have higher service requirements (reliability and security) than commercial communication networks and require direct signal transmission and reception, or D2D operation, between devices, especially when the coverage of cellular communications is insufficient or unavailable.

For example, D2D operation in general can have a variety of advantages in that it transmits and receives signals between nearby devices. For example, the D2D UE has high data rate and low delay and is capable of data communication. Also, the D2D operation can disperse the traffic to the base station, and can also expand the coverage of the base station if the UE performing the D2D operation acts as a repeater. Communication related to a vehicle, including transmission and reception of signals between vehicles with the above-mentioned extension of D2D communication, is called V2X (VEHICLE-TO-X) communication in particular.

At this time, when a terminal transmits a message transmitted in a semi-static manner, the present invention provides a method for preventing the message transmitted by the terminal from colliding with a message transmitted by a different terminal.

To prevent a message transmitted by a D2D terminal from colliding with a message transmitted by a different terminal, the D2D terminal needs to know the resources occupied by the different terminal.

Accordingly, the present invention provides a method by which a base station informs a D2D terminal of the information indicating resources occupied by a different terminal, wherein the terminal performs a D2D operation on the resources not occupied by the different terminal on the basis of the information; and a terminal using the method.

SUMMARY OF THE INVENTION

A technical problem of the present invention is to provide a D2D operation method performed by a terminal in a wireless communication system and a terminal using the method.

In an aspect, a method for vehicle-to-X (V2X) operation in a wireless communication system is provided. The method performed by a user equipment (UE) may comprise receiving, from a base station (BS), information indicating at least one or more candidate resources occupied by a different UE on a transmission resource at a particular time point among periodically configured transmission resources, wherein the at least one or more candidate resources occupied by the different UE are included in the transmission resource and transmitting a V2X message generated by a UE on the transmission resource on the basis of the information. The UE may transmit the V2X message on a candidate resource except for at least one or more candidate resources occupied by the different UE among a plurality of candidate resources included in the transmission resources at the particular time point.

A configuration period of the transmission resource may be shorter than a generation period of the V2X message, a configuration period of the transmission resource may be P where P is a positive value, and the transmission resource at the particular time point may be a transmission resource at K*P time point where K is a natural number.

The information may be about a plurality of transmission resources.

The transmission resource at the particular time point, on which K is minimized, may include candidate resources not occupied by the different UE.

If the UE transmits the V2X message, the UE may not transmit a newly generated V2X message during a predetermined time period.

If the amount of resources required for transmission of the V2X message is larger than candidate resources not occupied by the different UE, the UE may not transmit the V2X message on a candidate resource not occupied by the different UE.

If the BS succeeds to receive a message on a specific candidate resource, the specific candidate resource may be determined by a resource occupied by the different UE.

If a predetermined time has not been passed from the time point at which a specific candidate resource is determined as a resource occupied by the BS, the specific candidate resource may be determined as a resource occupied by the different UE.

If there exist a plurality of candidate resources not occupied by the different UE, the UE may randomly select one candidate resource among the plurality of candidate resources not occupied by the different UE and transmits the V2X message on the selected candidate resource.

The UE may be unable to directly detect a candidate resource not occupied by the different UE.

If there exist a plurality of candidate resources not occupied by the different UE and the UE is unable to directly detect a candidate resource not occupied by the different UE, the UE may transmit the V2X message on a candidate resource not occupied by the different UE and detected by the UE.

If the information indicates that the different UE occupies all of the candidate resources, the UE may not perform transmission of the V2X message.

If the information indicates that the different UE occupies all of the candidate resources, the UE may perform transmission of the V2X message on the basis of whether priority of the V2X message is higher than that of a message transmitted by the different UE.

In another aspect, a user equipment (UE) for vehicle-to-X (V2X) operation is provided. The UE may comprise a Radio Frequency (RF) transceiver that transmits and receives a radio signal and a processor operating being combined with the RF transceiver. The processor may control to receive, from a base station, information indicating at least one or more candidate resources occupied by a different UE on a transmission resource at a particular time point among periodically configured transmission resources, the at least one or more candidate resources occupied by the different UE may be included in the transmission resource, and control to transmit a V2X message generated by a UE on the transmission resource on the basis of the information. The UE may transmit the V2X message on a candidate resource except for at least one or more candidate resources occupied by the different UE among a plurality of candidate resources included in the transmission resources at the particular time point.

According to the present invention, a D2D operation method performed by a terminal in a wireless communication system and a terminal using the method are provided.

According to the present invention, the transmission time (or transmission resource) of a message transmitted in a semi-static manner may be predicted. Accordingly, a terminal according to the present invention may transmit a message generated by the terminal through a resource not occupied by a different terminal, thereby utilizing radio resources in an effective manner.

Moreover, to prevent a message transmitted by a D2D terminal from colliding with a message transmitted by a different terminal, the D2D terminal needs to know the resources occupied by the different terminal. At this time, a terminal not equipped with an Rx chain for a V2X carrier, such as a P-UE, may not sense (or detect) (V2X) resources occupied by a different terminal, and even if a terminal such as a V-UE is equipped with the Rx chain for a V2X chain, since the capability of sensing (or detecting) (V2X) resources occupied by the different terminal is lower than that of a base station, it is preferable for the terminal to obtain information about the resources from the base station rather than detect the resources occupied by the different terminal directly by itself. According to the present invention, since a terminal receives information indicating resources occupied by a different terminal from a base station, the terminal may efficiently avoid the resources occupied by the different terminal and perform D2D transmission.

DESCRIPTION OF EXEMPLARY EMBODIMENTS

Figure 1:
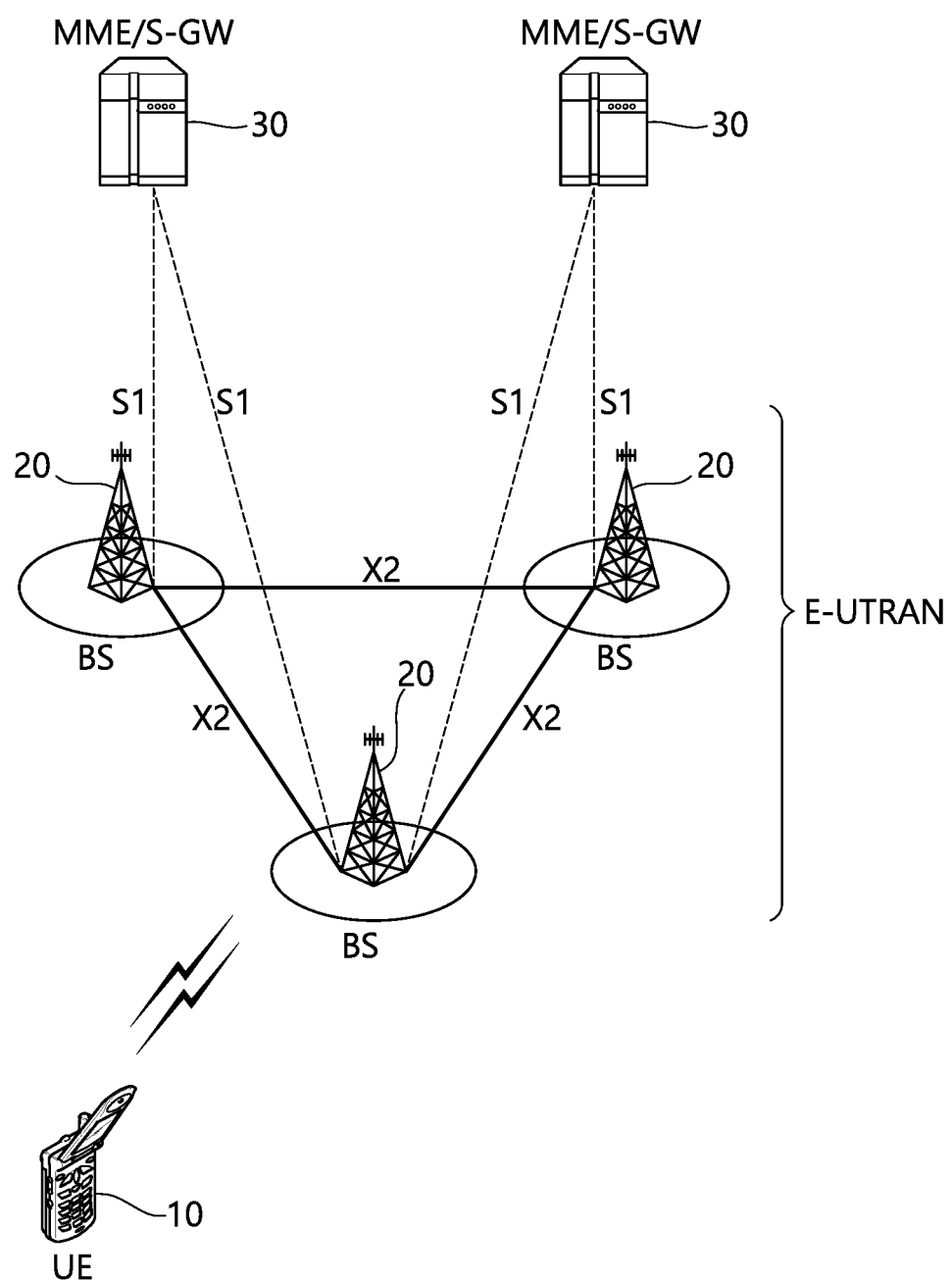
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
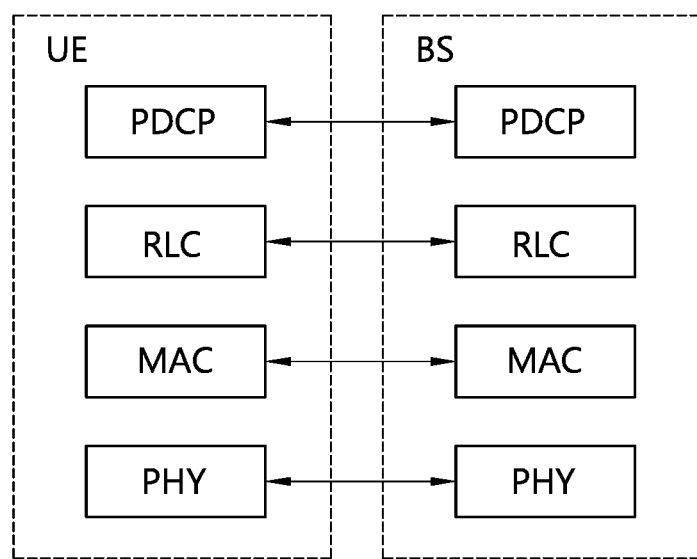
FIG. 2 is a diagram showing a wireless protocol architecture for a user plane.
Figure 3:
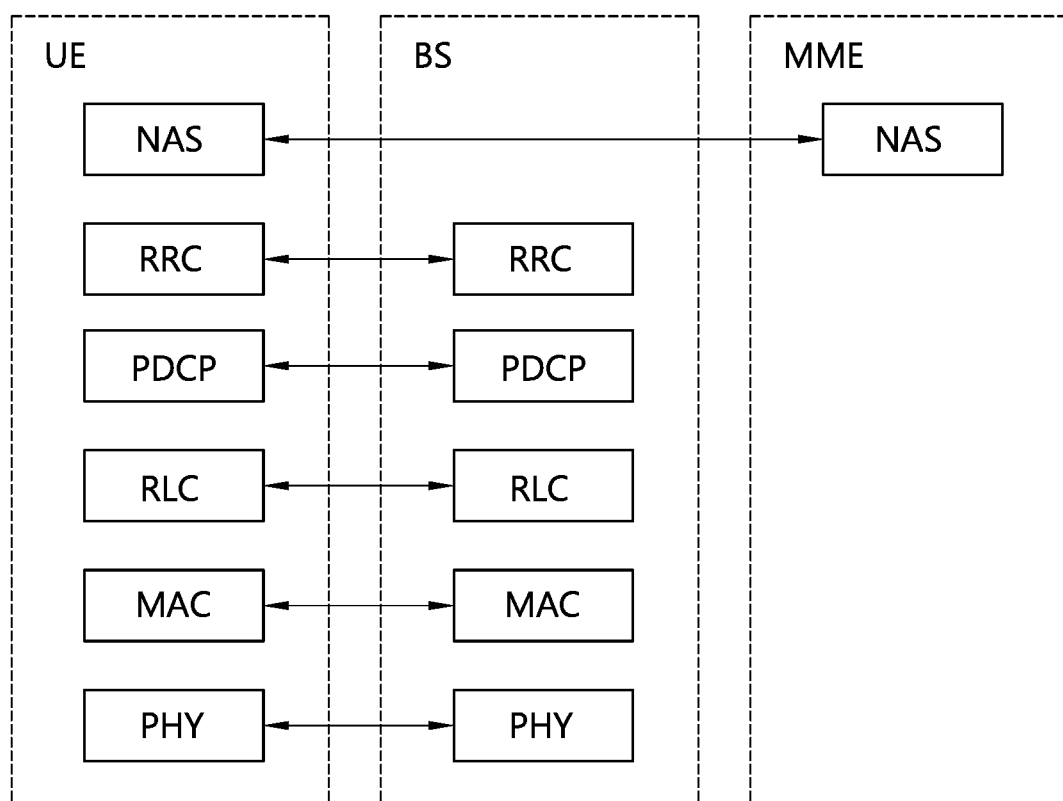
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 4:
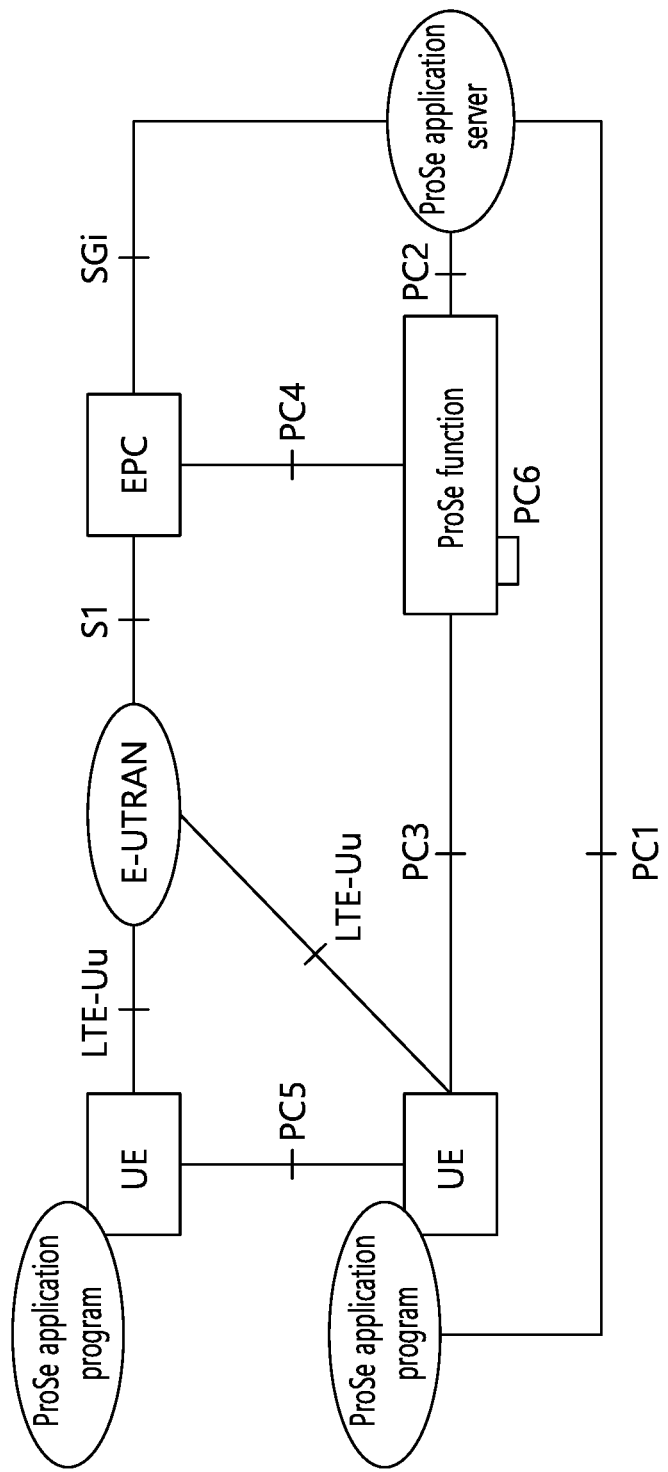
FIG. 4 illustrates a reference structure for a ProSe.

FIG. 4 illustrates a reference structure for a ProSe.

Referring to FIG. 4, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.
Interworking via a reference point towards the 3rd party applications
Authorization and configuration of the UE for discovery and direct communication)
Enable the function of the EPC level ProSe discovery
ProSe related new subscriber data and handling of data storage, and also handling of ProSe identities
Security related function
Provide control towards the EPC for policy related function
Provide function for charging (via or outside of EPC, e.g., offline charging))

Hereinafter, a reference point and a reference interface will be described in a reference structure for the ProSe.
PC1: a reference point between a ProSe application program in the terminal and a ProSe application program in a ProSe application server. The PC1 is used to define signaling requirements in an application level.
PC2: is a reference point between the ProSe application server and a ProSe function. The PC2 is used to define an interaction between the ProSe application server and a ProSe function. An application data update of a ProSe database of the ProSe function may be an example of the interaction.
PC3: is a reference point between the terminal and the ProSe function. The PC3 is used to define an interaction between the terminal and the ProSe function. Configuration for ProSe discovery and communication may be an example of the interaction.
PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.
PC5: is a reference point to use control/user plane for discovery, communication, and relay between terminals, and 1:1 communication.
PC6: is a reference point to use a function such as ProSe discovery between users included in different PLMNs.
SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 5:
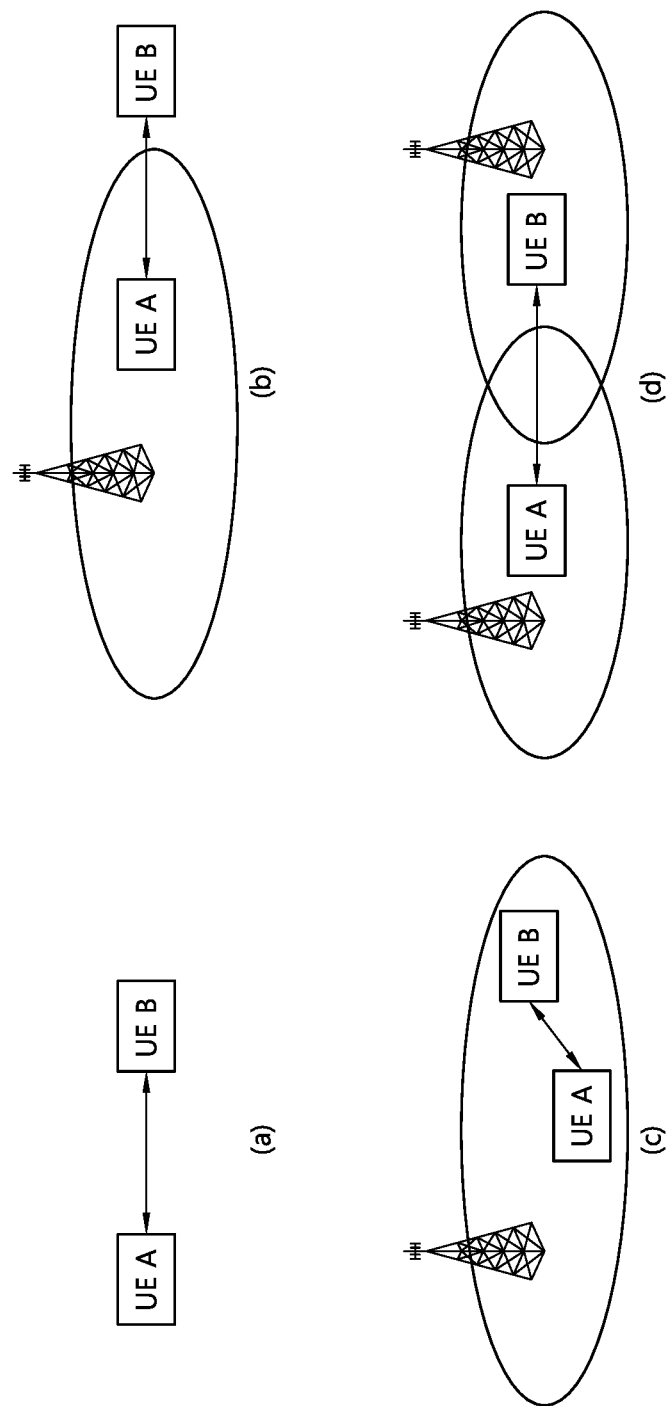
FIG. 5 illustrates arrangement examples of terminals performing ProSe direct communication and cell coverage.

FIG. 5 illustrates arrangement examples of terminals performing ProSe direct communication and cell coverage.

Referring to FIG. 5(a), UEs A and B may be located outside of the cell coverage. Referring to FIG. 5(b), the UE A may be located in the cell coverage and the UE B may be located outside of the cell coverage. Referring to FIG. 5(c), both of UEs A and B may be located in the cell coverage. Referring to FIG. 5(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 6:
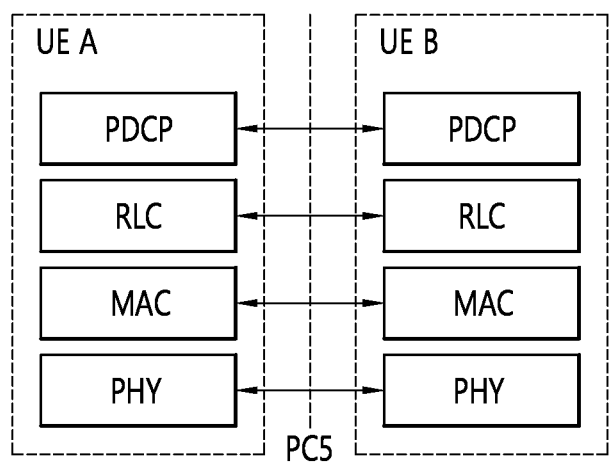
FIG. 6 illustrates a user plane protocol stack for the ProSe direct communication.

FIG. 6 illustrates a user plane protocol stack for the ProSe direct communication.

Referring to FIG. 6, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 7:
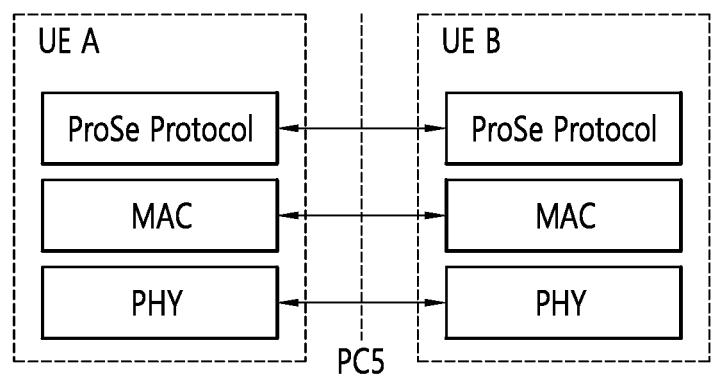
FIG. 7 illustrates a PC 5 interface for D2D discovery.

FIG. 7 illustrates a PC 5 interface for D2D discovery.

Referring to FIG. 7, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

In what follows, the present invention will be described.

As described above, in general, a D2D operation may have various advantages in terms of signal transmission and reception between adjacent devices. For example, a D2D UE may perform data transmission with a high transfer rate and low latency. Also, the D2D operation may disperse traffic concentrated to an eNB and if a UE performing the D2D operation acts as a relay, may expand the coverage of the eNB. As an extension of the D2D communication, vehicle-related communication, including signal transmission and reception between vehicles, is called Vehicle-To-X (V2X) communication in particular.

Here, in one example, the term 'X' in the Vehicle-To-X (V2X) represents pedestrian (communication between a vehicle and a device carried by an individual (for example, a handheld terminal carried by a pedestrian, cyclist, driver, or passenger)) (V2P), vehicle (communication between vehicles) (V2V), or infrastructure/network (communication between a vehicle and a roadside unit (RSU)/network, where an RSU is a transportation infrastructure entity, for example, an entity transmitting speed notifications implemented in an eNB or a stationary UE) (V2I/N). As one example, for the convenience of description, a (V2P communication-related) device carried by a pedestrian (or person) is called a "P-UE" while a (V2X communication-related) device installed in a vehicle is called a "V-UE". Also, the term 'entity' in this document may be interpreted as P-UE and/or V-UE and/or RSU (/network/infrastructure).

A UE providing (or supporting) the aforementioned D2D operation may be called a D2D UE, and a UE providing (or supporting) the aforementioned V2X operation may be called a V2X UE. In what follows, for the convenience of description, embodiments of the present invention will be described mainly with respect to the V2X UE, but it should be noted that the descriptions with respect to the corresponding V2X UE may also be applied to the D2D UE.

A V2X UE may perform message (or channel) transmission on a predefined (or signaled) resource pool. Here, a resource pool may refer to a predefined resource(s) which enables a UE to perform a V2X operation (or which is capable of performing a V2X operation). At this time, a resource pool may also be defined in terms of time-frequency aspect.

A V2X UE may transmit a message by using a dynamic resource allocation-based transmission method or a semi-static resource allocation-based transmission method. Here, in one example, a semi-static resource allocation-based transmission method provides an advantage of (relatively) reducing a probability of transmission resource collision among UEs since, in this method, the possibility (or probability) for a different (transmission) UE to recognize (or predict) and avoid a resource used (or to be used) by a specific transmission UE is relatively high.

In what follows, methods for alleviating collisions between transmitted messages (or channels) when a UE(s) performs message (or channel) transmission(s) (on a predefined (or signaled) resource pool) are proposed.

Here, in one example, the proposed methods of the present invention may be applied to a case in which 'a plurality of UE(s) perform message (or channel) transmission on a shared resource' (in a V2X communication environment) and/or a case in which 'message (or channel) transmission based on semi-statically allocation resources' is performed and/or a case in which 'message (or channel) transmission (utilizing a shared resource) for a relatively long time (or period) (or message (or channel) transmission based on a relatively large number of repetitions)' is performed.

Figure 8:
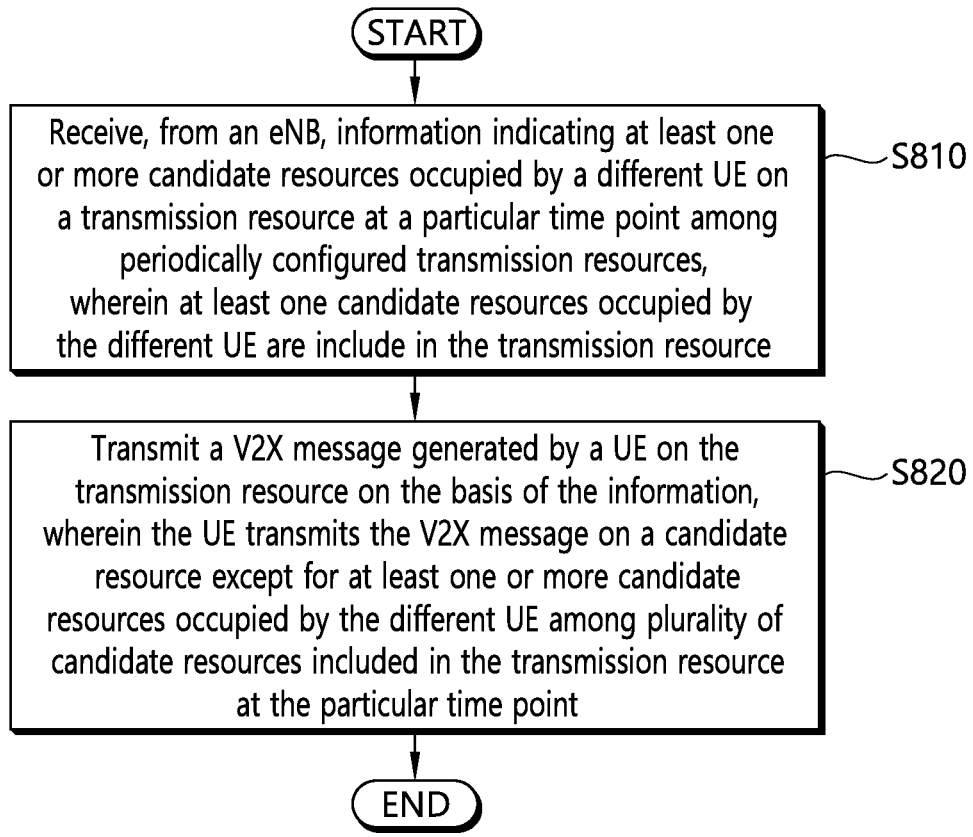
FIG. 8 is a flow diagram of a method for a V2X UE to perform a V2X transmission operation on a resource not occupied by a different UE according to one embodiment of the present invention.

FIG. 8 is a flow diagram of a method for a V2X UE to perform a V2X transmission operation on a resource not occupied by a different UE according to one embodiment of the present invention.

Referring to FIG. 8, a V2X UE receives, from an eNB, information indicating at least one candidate resource occupied by a different UE on transmission resources at particular time point among periodically-configured transmission resources S810. At this time, at least one candidate resource occupied by the different UE may be included in the transmission resources.

Here, in one example, the corresponding information signaled from an eNB may be useful particularly for hardware implementation related to a sensing operation and/or for the UE type (for example, P-UE) having a limitation in performing (a sensing operation) (for example, when a UE is not equipped with an RX chain and/or when a continuous sensing operation may not be performed due to battery consumption). Here, in one example, through a WAN downlink (for example, Downlink Control Information (DCI)), the corresponding information (for example, the information indicating the resource occupied by the different UE or auxiliary information about the information indicating a resource occupied by the different UE) may be signaled.

The eNB may inform the UE(s) of the information (for example, in the form of a bitmap) about resources occupied (or not-occupied) (at a particular time point (or in a (resource pool) period)) through predefined (physical layer or upper layer) signaling.

As a specific example, the corresponding (physical layer) signal may be implemented in the form of DCI (meant for the aforementioned use) detected (blindly) on the basis of a predefined (signaled) RNTI on the Common Search Space (CSS) (or UE-specific Search Space (USS)) and/or in the form of PDSCH scheduled by DCI (or PDCCH) of the CSS (or USS) and/or in the form of a (broadcasting) channel (meant for the aforementioned use) transmitted on the basis of a predefined (or signaled) resource (or period).

Also, in one example, the information may be signaled through a predefined (or signaled) PHICH resource (for example, PHICH group number or PHICH sequence number) (or PCFICH resource). Also, in one example, by using the (physical layer) signal described above, the eNB may inform the UE(s) of the information about 'release (or deactivation or activation)' of resources (semi-statically) allocated in advance. Here, in one example, the 'released (or deactivated)' resource may be (implicitly) regarded as an unoccupied resource.

As another example, an "occupied resource" (determined by the eNB) may be defined as a resource which satisfies (all or part of) the following condition(s).

(Example #1): A resource exhibiting (average) energy larger than a threshold value predefined (or signaled) (before a specific time point (or a (resource pool) period)).

(Example #2): A resource for which a message (or channel) reception (or decoding) has been (actually) succeeded (or failed) (before a specific time point (or a (resource pool) period)). More specifically, the eNB may overhear messages transmitted by V2X UEs and when overhearing a message transmitted by a different V2X UE, perform even SA decoding with respect to the message. Accordingly, when the UE performs decoding of the message successfully, the eNB may determine that the resource in which decoding of the message is actually performed has been occupied by transmission of a different UE.

(Example #3): A resource (semi-statically) allocated for message (or channel) transmission of a specific UE(s) (for example, a resource 'not released (or deactivated)' or a resource for which a timer related to maintaining allocation of (semi-static) resources has not expired yet).

(Example #4): A resource which has not passed time 'T' since it has been determined as an occupied resource. Here, in one example, the corresponding 'T' value may be regarded as the maximum time up to which the resource is assumed as an occupied resource (or up to which an occupied resource is protected). Here, in one example, the eNB may regard a resource which has not passed the time 'T' from since it is determined as an occupied resource as a resource occupied by a different UE while a resource which has passed the time 'T' from since it is determined as an occupied resource is determined as a resource not occupied by a different UE. Here, the time 'T' may denote 1 second. Moreover, T may have a value which is a multiple of the SPS resource period (for example, if the SPS resource period has a value of 'P', T may be K*P, where K is a natural number).

In what follows, a specific example to which the proposed methods described above are applied will be described with reference to a related drawing illustrating 1. an example in which a Semi-Persistent Scheduling (SPS) resource (or a semi-statically allocated resource) is configured to have a period (P) shorter than the period (M) of message generation (or transmission) because of a (V2X service-related) latency requirement and 2. an example in which an SPS resource (or a semi-statically allocated resource) is configured to have a period (P) which is the same as the period (M) of message generation (or transmission).

1. A case in which an SPS resource (or a semi-statically allocated resource) is configured to have a period (P) shorter than the period (M) of message generation (or transmission).

Figure 9:
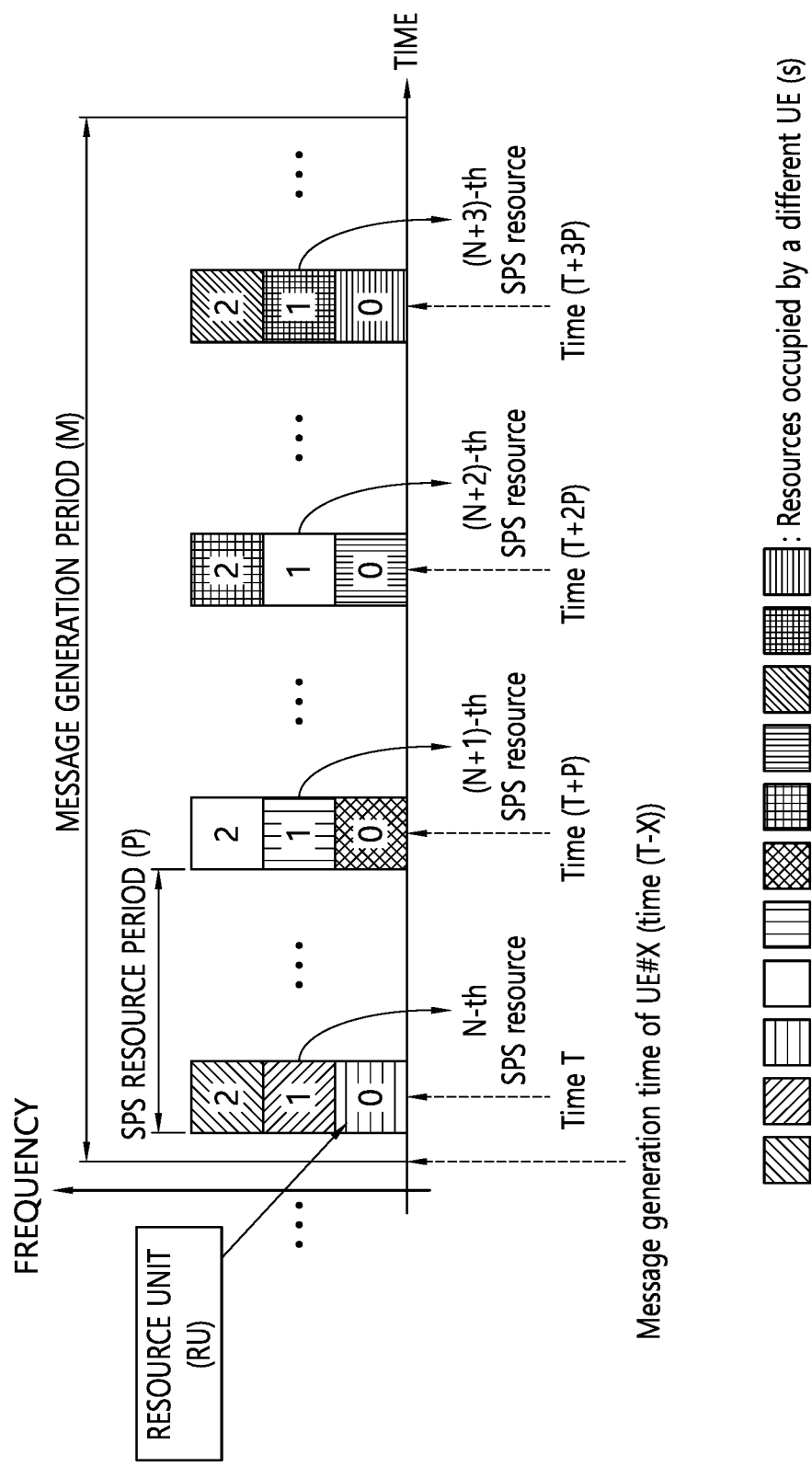
FIG. 9 illustrates an example in which an SPS resource is configured to have a period shorter than the period of message generation (or transmission).

FIG. 9 illustrates an example in which an SPS resource is configured to have a period shorter than the period of message generation (or transmission).

As one example, the reason why an SPS resource is configured to have a period (relatively) shorter than the period of message generation (or transmission) is that even though a V2X message generation (or transmission) period may be affected by various factors (for example, the amount of acceleration or driving direction), effective V2X message transmission has to be performed while satisfying a predefined (latency (or reliability)) requirement.

Here, in one example, a plurality of UE(s) perform message transmission (according to a predefined (or signaled) rule) on the corresponding shared resource (namely the SPS resource (or the semi-statically allocated resource)). Also, in FIG. 9, it is assumed that the entire RU(s) on the N, (N+1), and (N+3)-th SPS resource(s) and RU#0/2 on the (N+2)-th SPS resource are used (or occupied) by message transmissions of a different UE(s).

In this situation, when UE#X which has generated a message at (T–X) time point attempts message transmission, the proposed methods described below enables the UE#X to perform resource selection which avoids resources already used (or occupied) by a different UE(s) (as possibly as can be).

Figure 10:
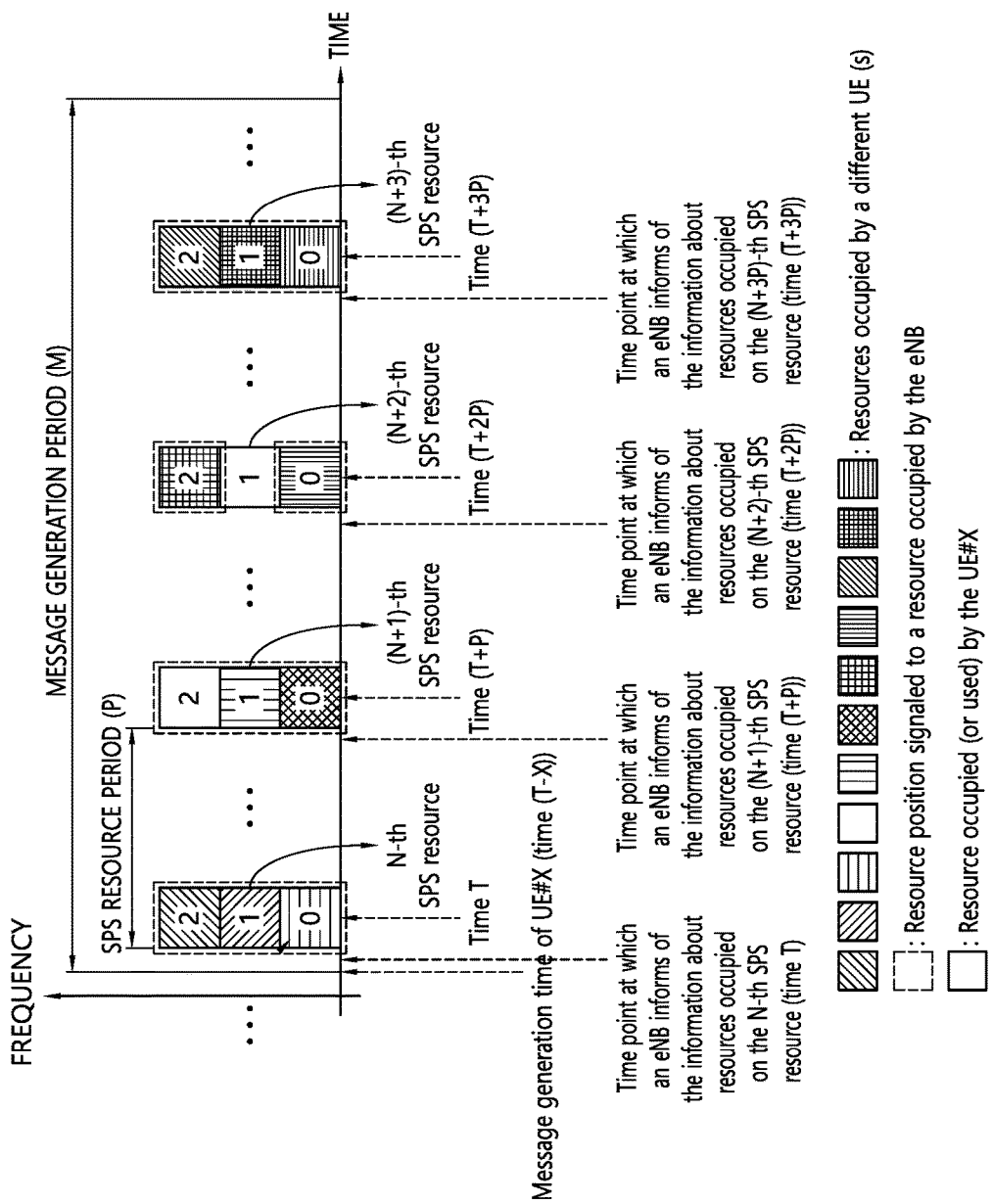
FIG. 10 illustrates an example to which a proposed method according to the present invention is applied when an SPS resource is configured to have a period shorter than the message generation (or transmission) period.

FIG. 10 illustrates an example to which a proposed method according to the present invention is applied when an SPS resource is configured to have a period shorter than the message generation (or transmission) period.

Here, in one example, the UE#X which has generated a message at time (T−X) determines whether it is possible (for the UE#X) to transmit its message on the 'N-th SPS resource' on the basis of the 'information about the occupied resources on the N-th SPS resource' received from an eNB at a particular time point before the 'N-th SPS resource'.

Here, in one example, in the case of FIG. 10, since all of the resources on the 'N-th SPS resource' have already been occupied by a different UE(s), the UE#X does not perform message transmission on the 'N-th SPS resource' but still again determines whether to perform message transmission on the '(N+1)-th SPS resource' on the basis of the 'information about occupied resources on the (N+1)-th SPS resource' received from the eNB at a particular time point before the '(N+1)-th SPS resource'.

Here, in one example, in the case of FIG. 10, since all of the resources on the '(N+1)-th SPS resource' have already been occupied by a different UE(s), the UE#X does not perform message transmission on the '(N+1)-th SPS resource' in the same manner but determines again whether to perform message transmission on the '(N+2)-th SPS resource' on the basis of the 'information about occupied resources on the (N+2)-th SPS resource' at a particular time point before the '(N+2)-th SPS resource'.

Here, in one example, in the case of FIG. 10, since RU#1 on the '(N+2)-th SPS resource' has not been occupied (by a different UE(s)), the UE#X performs transmission of its message (generated at time (T−X)) by using the corresponding RU#1. In other words, when the proposed method is applied, the UE#X avoids the resources (for example, RU#0/2) already occupied on the '(N+2)-th SPS resource' and efficiently selects a resource (for example, RU#1) to be used for its message transmission from the '(N+2)-th SPS resource' (or uses the resources selected randomly from unoccupied resources (on the '(N+2)-th SPS resource') for transmission of its message on the '(N+2)-th SPS resource').

For the convenience of descriptions, in one example, although it has been assumed that 'information about occupied resources on a (subsequent) SPS resource' is signaled by the eNB at a particular time point before each SPS resource, according to a predefined rule (or a signaled parameter (for example, a parameter related to whether information transmitted at a particular time point simultaneously informs of the information about occupied resources on a number of (subsequent) SPS resource(s))), information transmitted at a particular time point may provide 'information about occupied resources on a plurality of (subsequent) SPS resource(s)' (simultaneously).

According to the proposed method, the eNB informs the UE#X of whether the SPS resource at time T has been occupied, the UE#X which has generated a message at (T−X) repeats checking whether the SPS resource at (T+P) is empty (on the basis of a related signal (or information) received from the eNB) if the SPS resource at time T has been occupied already, and performs message transmission on an empty SPS resource on which K is minimized among the SPS resource(s) at time (T+K*P) (namely K is a positive integer larger than 0).

Here, in another example, a rule may be defined so that the UE is prohibited from using a resource (for message transmission) for a predetermined (or signaled) time period once the UE uses a resource (for message transmission) (although it will be the case that if the UE performs message transmission, it will not perform transmission until the next message is created (or generated)).

If this rule is applied, as one example, even if the SPS (resource configuration) period (P) is shorter than the message generation (or transmission) period (M), multiple UE(s) may share the SPS resource in the form of the TDM scheme in an alternate fashion. As another example, if the present invention is applied, it may be interpreted (or considered) that the 'period at which the SPS resource appears' and the 'period at which a UE is able to use the SPS resource' may be configured differently.

2. A case in which an SPS resource (or a semi-statically allocated resource) is configured to have the same period (P) as the period (M) of message generation (or transmission).

Figure 11:
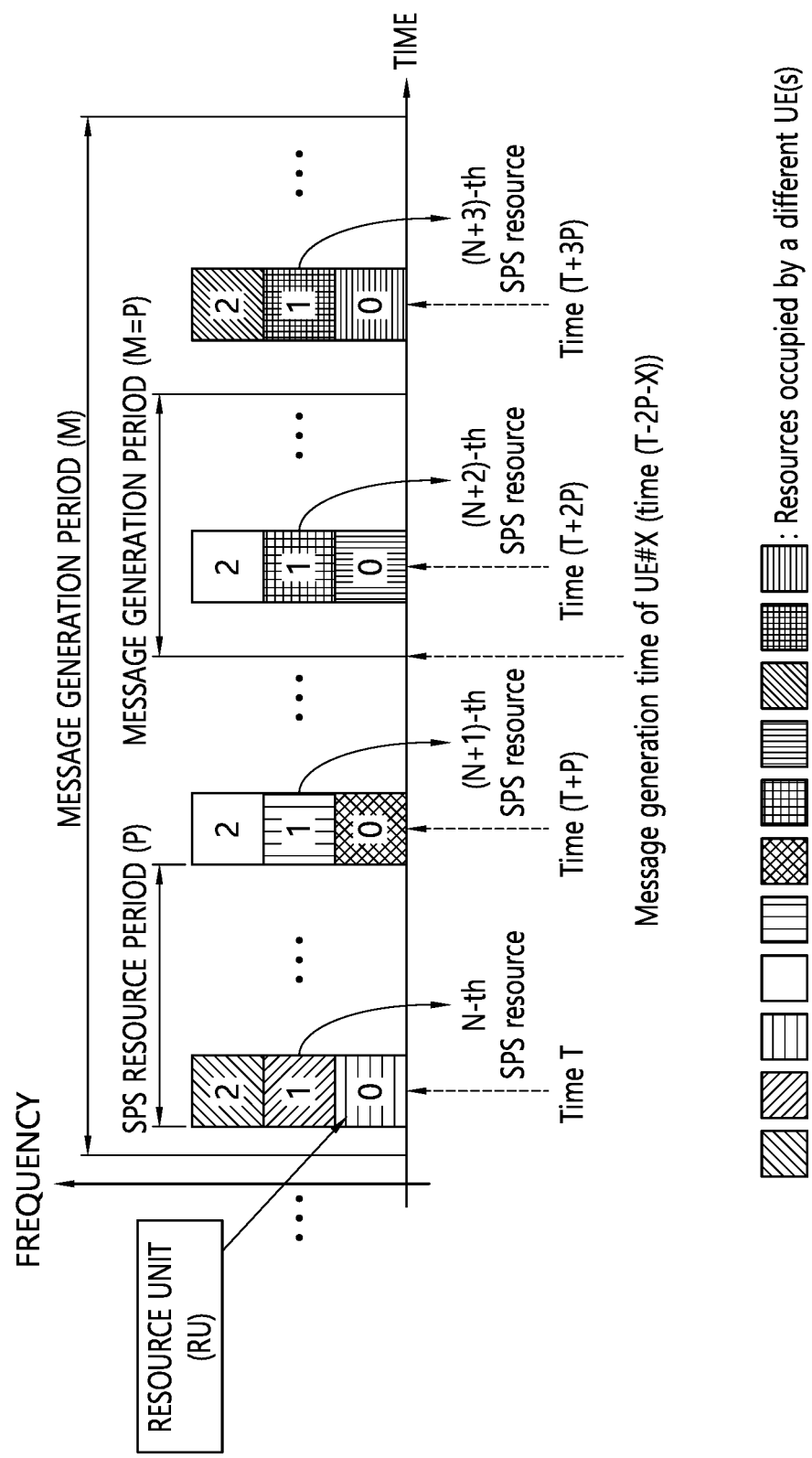
FIG. 11 illustrates an example in which an SPS resource is configured to have the same period as a message generation (or transmission) period.

FIG. 11 illustrates an example in which an SPS resource is configured to have the same period as a message generation (or transmission) period.

Also, FIG. 11 assumes that the entire RU(s) on the N, (N+1), and (N+3)-th SPS resource(s) and RU#0/1 on the (N+2)-th SPS resource are used (or occupied) by message transmission of different UE(s).

If the proposed methods described below are applied, the UE#X which has generated a message at (T+2P−X) time point becomes able to perform resource selection which avoids resources already used (or occupied) by a different UE(s) (as possibly as can be).

Figure 12:
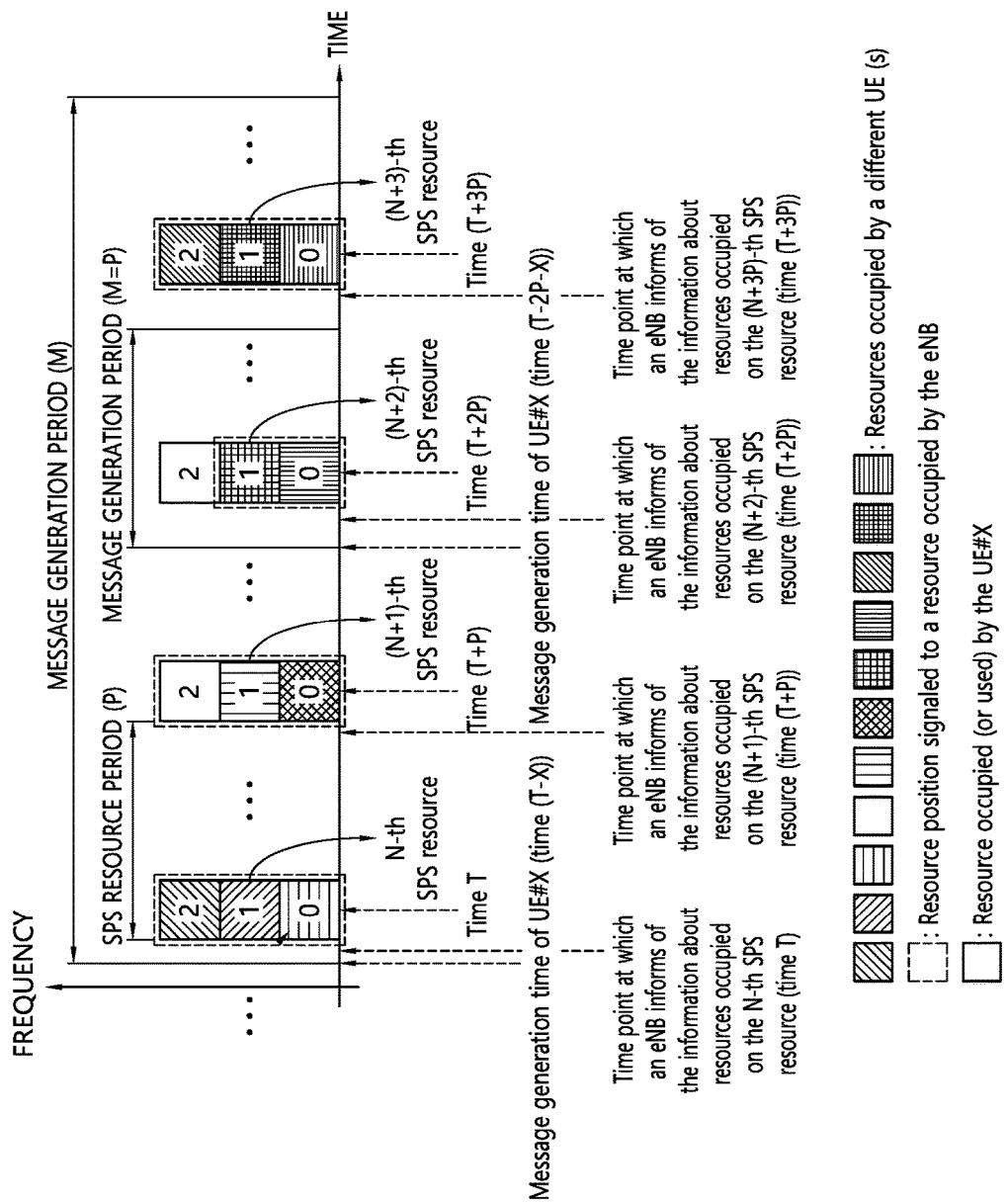
FIG. 12 illustrates an example in which the proposed method of the present invention is applied when an SPS resource is configured to have the same period as a message generation (or transmission) period.

FIG. 12 illustrates an example in which the proposed method of the present invention is applied when an SPS resource is configured to have the same period as a message generation (or transmission) period.

Here, in one example, the UE#X which has generated a message at time (T+2P−X) determines whether it is possible to transmit its message on the '(N+2)-th SPS resource' on the basis of the 'information about the occupied resources on the (N+2)-th SPS resource' received from an eNB at a particular time point before the '(N+2)-th SPS resource'.

Here, in one example, since, in the case of FIG. 12, RU#2 on the '(N+2)-th SPS resource' has not been occupied (by a different UE(s)), the UE#X performs transmission of its message (generated at time (T+2P−X)) by using the corresponding RU#2.

Referring again to FIG. 8.

The UE may transmit a V2X message generated therein on the transmission resource on the basis of the information S820. At this time, the UE may transmit the V2X message on a candidate resource not occupied by a different UE among a plurality of candidate resources belonging to the transmission resource.

Here, the information received by the UE may directly indicate a resource unit not occupied by the different UE among SPS resources at a particular time point (for example, the aforementioned time T+K*P where K is a natural number and T is a multiple of P as described above). For example, according to the example of FIG. 9, the information may indicate RU#1 in the SPS resource at time T+2P.

Similarly, the information received by the UE may indicate an SPS resource including a resource unit not occupied by the different UE among SPS resources at a particular time point (for example, the aforementioned time T+K*P where K is a natural number and T is a multiple of P as described above). For example, according to the example of FIG. 9, the information may indicate that there exists a resource on the SPS resource at time T+2P, not occupied by the different UE.

If the information received by the UE directly indicates a resource unit not occupied by the different UE among SPS resources at a particular time point, the UE may perform V2X transmission on the resource not occupied by the different UE on the basis of the information irrespective of whether or not the UE is unable to sense resources occupied by different UE.

If the information received by the UE indicates an SPS resource including a resource unit not occupied by the different UE and the UE is able to sense resources occupied by different UEs, the UE may first sense the resources not occupied by different UEs on the SPS resource and then perform V2X transmission on the sensed resource (for example, a resource unit (RU)) not occupied by the different UEs.

If the information received by the UE indicates an SPS resource including a resource unit not occupied by the different UE but the UE is unable to sense resources occupied by different UEs, the UE may, for example, select one resource (for example, an RU) from the SPS resource in a random fashion and perform V2X transmission on the selected resource.

If the information received by the UE indicates that there is a plurality of resource units not occupied by the different UE, the UE may, for example, select one resource unit randomly from the plurality of resource units and perform V2X transmission of a message generated on the selected resource unit.

The information received by the UE may include information indicating that the SPS resource does not have a resource by which the UE may perform V2X transmission (in other words, information indicating that the entire SPS resources have been occupied by different UEs). If the information received by the UE indicates that the SPS resource does not have a resource by which the UE may perform V2X transmission, the UE may either 1) not transmit the generated message or 2) perform V2X transmission of a generated message according to the priority of the message. For example, priorities between the message transmitted by a different UE, which has been detected by the UE by sensing the SPS resource, and the message generated by the UE may be compared with each other. Afterwards, if the priority of a message generated by the UE is higher than that of the message transmitted by a different UE, the UE may perform transmission of the message generated therein (for example, by lowering an energy sensing threshold value).

As one example, a rule may be defined so that if the amount (AVL_RSC) of unoccupied resources (on the N-th SPC resource) informed by the eNB is less than the amount of resources (REQ_RSC) required for transmission of the UE's message, the UE may postpone (or omit) the message transmission (on a subsequent SPS resource which satisfies the condition 'AVL_RSC≥REQ_RSC') (by assuming that there is no unoccupied resource on the N-th SPS resource).

The embodiment of the present invention described above may be depicted in the form of a flow diagram as follows.

Figure 13:
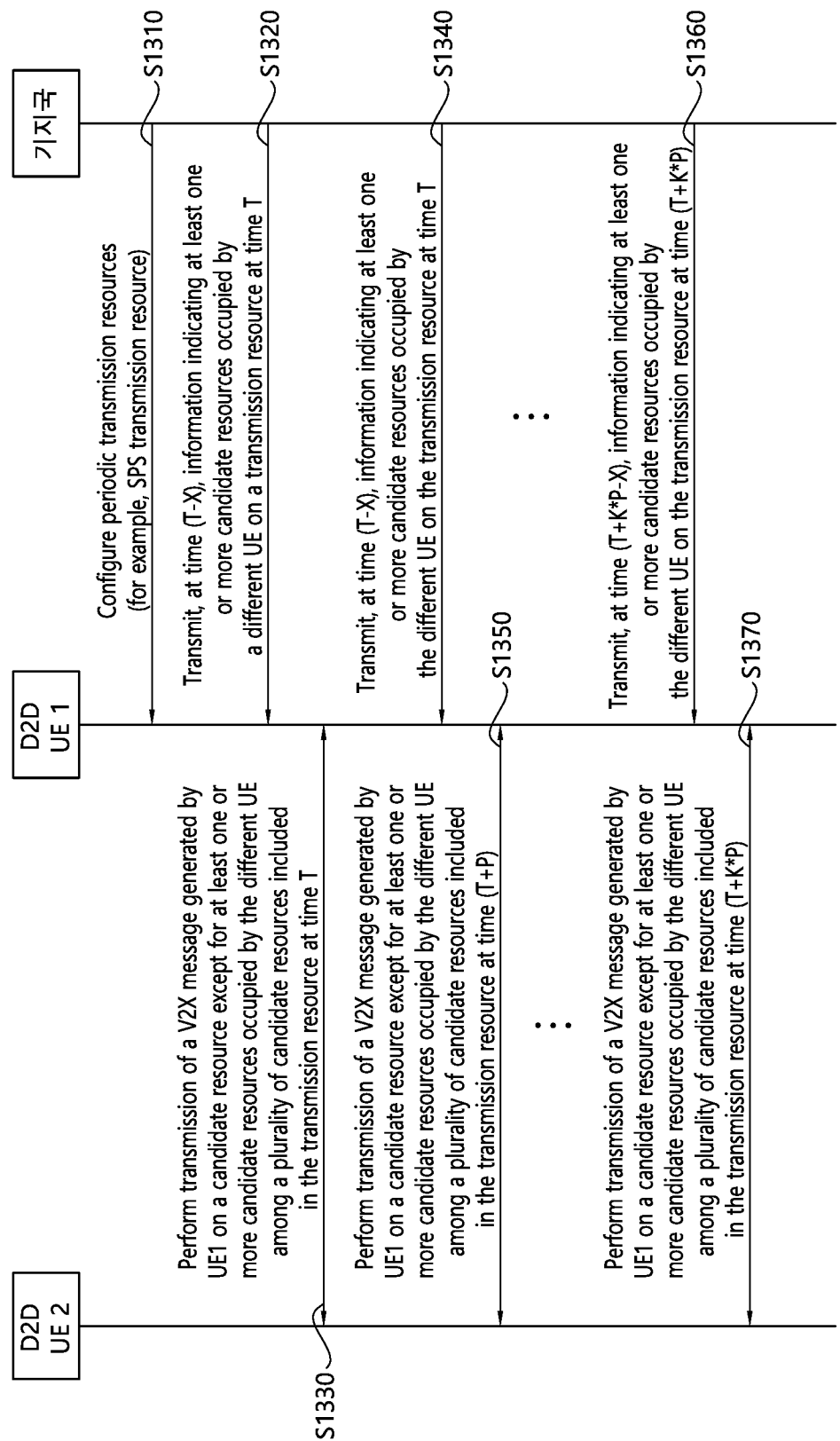
FIG. 13 is a flow diagram of a method for a V2X UE to perform a V2X operation on a resource not occupied by a different UE according to one embodiment of the present invention.

FIG. 13 is a flow diagram of a method for a V2X UE to perform a V2X operation on a resource not occupied by a different UE according to one embodiment of the present invention.

According to FIG. 13, the V2X UE (for example, UE1) receives information which configures periodic transmission resources (for example, SPS transmission resources) S1310. At this time, as described above, the UE1 may configure the periodic transmission resources on the basis of the received information. As described above, the period of the transmission resource may be shorter than or equal to the generation period of a V2X message generated by the UE1.

At time (T−X), the UE1 may receive information indicating at least one or more candidate resources occupied by a different UE on the transmission resources at time T S1320. Here, a specific example of the information received by the UE1 is the same as described above, detailed descriptions thereof will be omitted.

Afterwards, the UE2 may perform transmission of a V2X message generated by the UE1 on a candidate resource except for at least one or more candidate resources occupied by the different UE among a plurality of candidate resources belonging to the transmission resource at time T S1330. At this time, as described above, if the amount of resources required for transmission of the V2X message is larger than the candidate resources unoccupied by the different UE, the UE may not transmit the V2X message by using the candidate resources not occupied by the different UE (at time T). As described above, when there exist multiple candidate resources not occupied by the different UE, the UE may select one candidate resource randomly among the candidate resources not occupied by the different UE and transmit the V2X message on the selected candidate resource. As described above, if the information indicates that the different UE occupies all of the candidate resources, the UE may not perform transmission of the V2X message. As described above, if the information indicates that the different UE occupies all of the candidate resources, the UE may transmit the V2X message depending on whether the priority of the V2X message is higher than the priority of the message transmitted by the different UE. As described above, the V2X message may be a D2D message. In other words, since a specific example where a UE transmits a V2X message is the same as described above, detailed descriptions thereof will be omitted.

Afterwards, the UE may receive information indicating at least one or more candidate resources occupied by a different UE on the transmission resource at time (T+P) S1340. Since a specific example of the information is the same as described above, detailed descriptions thereof will be omitted.

Afterwards, the UE may perform transmission of a V2X message generated by the UE1 on the candidate resource except for at least one or more candidate resources occupied by the different UE among a plurality of candidate resources belonging to the transmission resource at time (T+P) S1350. In other words, since a specific example in which a UE transmits a V2X message is the same as described above, detailed descriptions thereof will be omitted.

Afterwards, at time (T+K*P−X), the UE may receive information indicating at least one or more candidate resources occupied by the different UE on the transmission resource at time (T+K*P) S1360. Since a specific example about the information is the same as described above, detailed descriptions thereof will be omitted.

Afterwards, the UE may perform transmission of a V2X message generated by the UE1 on the candidate resource except for at least one or more candidate resources occupied by the different UE among a plurality of candidate resources belonging to the transmission resource at time (T+K*P) S1370. In other words, since a specific example in which a UE transmits a V2X message is the same as described above, detailed descriptions thereof will be omitted.

[183] As one example, the proposed methods of the present invention may configure (or signal) a resource at semi-static (or fixed) position (or period) on a (WAN) UL resource and/or sidelink (or PC5 link) resource and may be further applied to (all of) the cases in which V2X (for example, V2V, V2P, or V2I/N) communication is performed by using the corresponding, configured (or signaled) resource.

Here, in one example, when a resource based on a semi-static (or fixed) position (or period) is configured (or signaled) on a sidelink (or PC5 link) resource and V2V communication is performed by using the corresponding, configured (or signaled) resource, a V-UE performing a reception (or transmission) operation may be configured to inform a V-UE(s) (or P-UE(s)) performing a transmission operation (of interest) (in the surroundings of the V-UE) of the information about occupied (or unoccupied) resources (in view of the V-UE).

Since examples of the proposed methods described above may also be included as implementation methods of the present invention, it is apparent that the examples may also be regarded as a kind of proposed methods.

Also, although the proposed methods above may be implemented independently, they may be implemented in the form of a combination (or merger) of part of the proposed methods.

In one example, although the present invention describes the proposed methods on the basis of the 3GPP LTE system for the convenience of descriptions, the range of systems to which the proposed methods are applied may be expanded to include other systems in addition to the 3GPP LTE system.

As one example, the proposed methods of the present invention may be extended to be applied for D2D communication. Here, in one example, D2D communication refers to communication performed by a UE directly to other UE using a radio channel, where in this example, the UE means a terminal of the user; however, when a network device such as an eNB transmits or receives a signal to and from a UE according to a communication method, the eNB may also be regarded as a kind of UE.

As one example, a rule may be defined so that the proposed methods of the present invention may be applied limitedly only to MODE 2 (V2X or D2D) communication and/or type 1 (V2X or D2D) discovery (and/or MODE 1 (V2X or D2D) communication and/or type 2 (V2X or D2D) discovery).

Also, in one example, a rule may be applied so that the proposed methods of the present invention may be applied limitedly only to an in-coverage D2D (or V2X) UE (and/or out-coverage D2D (or V2X) UE) (and/or RRC_CONNECTED D2D (or V2X) UE (and/or RRC_IDLE D2D (or V2X) UE) and/or relay D2D (or V2X) UE (and/or remote (D2D (or V2X)) UE (participating in RELAY communication)).

Also, in one example, the proposed methods of the present invention may be extended to be applied to (VoIP (or URLLC)) SPS (or UL) communication between an eNB and a UE and/or a GRANT-free (and/or contention based) UL TX operation.

Figure 14:
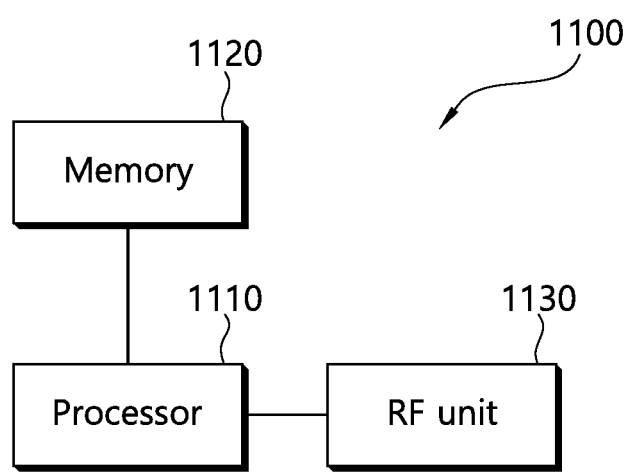
FIG. 14 is a block diagram of a UE in which an embodiment of the present invention is implemented.

FIG. 14 is a block diagram of a UE in which an embodiment of the present invention is implemented.

Referring to FIG. 14, the UE 1100 comprises a processor 1110, a memory 1120, and a Radio Frequency (RF) unit 1130.

According to one embodiment, the processor 1110 may receive, from an eNB, information indicating at least one or more candidate resources occupied by a different UE on a transmission resource at a particular time point among transmission resources configured periodically. At this time, at least one or more candidate resources occupied by the different UE may be included in the transmission resources. Afterwards, the processor 1110 may transmit a D2D message generated by the UE on the transmission resource on the basis of the information, where the UE may be configured to transmit the D2D message on a candidate resource except for at least one or more candidate resources occupied by the different UE among a plurality of candidate resources belonging to the transmission resource at the particular time point.

The RF unit 1130, being connected to the processor 1110, transmits and receives a radio signal.

The processor may include Application-Specific Integrated Circuit (ASIC), other chipsets, logical circuit and/or data processing device. The memory may include Read-Only Memory (ROM), Random Access Memory (RAM), flash memory, memory card, storage medium and/or other storage device. The RF unit may include a baseband circuit to process a radio signal. When embodiments are implemented by software, the methods described above may be implemented by a module (process, function, and so on) which performs the functions described above. A module may be stored in the memory and executed by the processor. The memory may be installed inside or outside the processor and may be connected to the processor via various well-known means.

What is claimed is:

1. A method for transmitting a vehicle-to-X (V2X) message in a wireless communication system, the method performed by a user equipment (UE) and comprising:
receiving, from a base station (BS), information informing the UE of at least one or more candidate resources which are occupied by at least one different UE,
wherein semi-persistent scheduling (SPS) resources are configured to the UE, and
wherein the at least one or more candidate resources are located on the SPS resources; and
transmitting the V2X message, which is generated by the UE, on the SPS resources based on the information,
wherein the at least one different UE is a UE performing V2X operation,
wherein a configuring period of the SPS resources is shorter than a generation period of the V2X message,
wherein the UE is a pedestrian UE possessed by a pedestrian,
wherein the pedestrian UE is a UE not having a receiving chain for a V2X carrier, and
wherein, when the UE does not support sensing the at least one or more candidate resources occupied by the at least one different UE and the information informs the UE of the one or more candidate resources, the UE randomly selects one of the SPS resources and transmits the V2X message on the selected SPS resource.

2. The method of claim 1, wherein, if the UE transmits the V2X message, the UE does not transmit a newly generated V2X message during a predetermined time period.

3. A user equipment (UE) comprising:
a transceiver that transmits and receives a radio signal; and
a processor operatively coupled to the transceiver, the processor configured to:
receive, from a base station (BS), information informing the processor of at least one or more candidate resources which is occupied by at least one different UE,
wherein semi-persistent scheduling (SPS) resources are configured to the UE, and
wherein the at least one or more candidate resource is located on the SPS resources; and
transmit a vehicle-to-X (V2X) message, which is generated by the UE, on the SPS resources based on the information, wherein the at least one different UE is a UE performing V2X operation, wherein a configuring period of the SPS resources is shorter than a generation period of the V2X message, wherein the UE is a pedestrian UE possessed by a pedestrian, wherein the pedestrian UE is a UE not having a receiving chain for a V2X carrier, and wherein, when the UE does not support sensing the at least one or more candidate resources occupied by the at least one different UE and the information informs the UE of the at least one or more candidate resources, the UE randomly selects one of the SPS resources and transmits the V2X message on the selected SPS resource.

* * * * *